United States Patent
Maddali et al.

(10) Patent No.: US 8,305,049 B2
(45) Date of Patent: Nov. 6, 2012

(54) STARTER VOLTAGE REDUCING SYNCHRONOUS MACHINE

(75) Inventors: Vijay K. Maddali, Rockford, IL (US); Adrian E. Vandergrift, Rockton, IL (US); Deron J. Staas, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 652 days.

(21) Appl. No.: 12/418,940

(22) Filed: Apr. 6, 2009

(65) Prior Publication Data
US 2010/0253294 A1 Oct. 7, 2010

(51) Int. Cl.
*H02K 11/00* (2006.01)
(52) U.S. Cl. .................................... 322/58; 322/59
(58) Field of Classification Search ............ 322/58, 322/59, 37
See application file for complete search history.

(56) References Cited

U.S. PATENT DOCUMENTS

| | | | |
|---|---|---|---|
| 4,409,637 A | 10/1983 | Block | |
| 4,554,608 A | 11/1985 | Block | |
| 5,508,601 A * | 4/1996 | Good et al. | 322/37 |
| 5,656,966 A | 8/1997 | Wilmot et al. | |
| 6,359,794 B1 | 3/2002 | Real | |
| 6,836,086 B1 | 12/2004 | Goldberg et al. | |
| 6,850,043 B1 | 2/2005 | Maddali | |
| 7,072,159 B2 | 7/2006 | Mercier | |
| 7,084,610 B2 * | 8/2006 | Chen | 322/28 |
| 7,268,522 B1 | 9/2007 | Baker | |
| 7,355,300 B2 | 4/2008 | Wilmot et al. | |
| 7,501,799 B2 | 3/2009 | Rozman et al. | |
| 2006/0061336 A1 * | 3/2006 | Anghel et al. | 322/59 |
| 2008/0024941 A1 | 1/2008 | Fish | |
| 2009/0045784 A1 * | 2/2009 | Xu et al. | 322/59 |

OTHER PUBLICATIONS

United Kingdom Search Report for UK Application No. GB1003263.9, Jun. 25, 2010.

* cited by examiner

*Primary Examiner* — Nguyen N Hanh
(74) *Attorney, Agent, or Firm* — Carlson, Gaskey & Olds PC

(57) ABSTRACT

An electric power generation system has a synchronous machine, a starter excitation source and an exciter field driver. The starter excitation source is connected to the synchronous machine via multiple phase connections, and the exciter field driver is connected to the synchronous machine via a portion of the same phase connections. At least one of the phase connections is connected to each other phase connection via a transient voltage suppressor.

13 Claims, 1 Drawing Sheet

STARTER VOLTAGE REDUCING SYNCHRONOUS MACHINE

BACKGROUND OF THE INVENTION

The present application relates to aircraft power generation systems, and specifically to synchronous machine starter/generators.

It is common in the aerospace industry to use a three phase synchronous machine to generate electrical power in an aircraft and to use the same three phase synchronous machine to provide a motive force for starting a turbine engine. In order for the synchronous machine to provide a motive force to a turbine engine, three phase power is provided to the synchronous machine from a three phase starter generator through a set of phase connections. The three phase power causes the synchronous machine's rotor to begin turning. The rotor is mechanically connected to a turbine engine such that when the rotor begins turning, the turbine is forced to turn as well. Once the turbine engine has started and is in a state where it can operate independent of the synchronous machine, the synchronous machine switches to a "generate mode" where a DC exciter field driver provides two DC phases with a switching voltage in order to generate an excitation field current needed for the synchronous machine to generate three phase power. In generate mode, the rotation of the turbine engine causes the synchronous machine to rotate, which in turn causes the synchronous machine to generate electrical energy according to known techniques.

In order to reduce weight and components, DC switching voltages are typically transmitted from the exciter field driver to the synchronous machine over two of the phase lines used by the starter generator during the start mode, and the third phase line is deactivated. This configuration results in voltage spikes in the deactivated phase each time the switching DC voltage switches from positive to negative (or vice versa), and can result in a voltage buildup within a generator control unit under certain conditions. Large voltage spikes can lead to breakdown of connectors/wiring and cause arcing. The arcing, in turn, can lead to a shorted rotating diode in the synchronous machine. If a shorted rotating diode condition is caused by other reasons, then in addition to extremely large voltage spikes in deactivated phase, there will be a rapid voltage buildup within the generator control unit.

Currently, methods are known for detecting shorted rotating diode conditions, however the known methods require a long response time. Rapid voltage buildup in the generator control unit can decrease the possible time to respond to a shorted rotating diode condition below the response times of the known methods. No methods are currently known in the art for reducing the rate of voltage buildup within a generator control unit.

The same or similar issues can arise in non-aerospace applications, including land based turbine generators, when an exciter field driver is used in a similar configuration with a synchronous generator.

SUMMARY OF THE INVENTION

Disclosed is an electrical system having a synchronous machine. The synchronous machine is connected to an exciter field driver via a plurality of phase connections. At least one of the phase connections has a voltage reduction module, having at least a transient voltage suppressor corresponding to each other phase connection. The transient voltage suppressor connects corresponding phase connections.

Also disclosed is a method for reducing a voltage buildup within an electric power generation system control unit. The method includes the step of dissipating voltage spikes across the phase connections in a plurality of transient voltage suppressors which are connected across the phase connections.

Also disclosed is an aircraft power generation system with a synchronous machine which is connected to a turbine rotor. A starter generator and an exciter field driver are both connected to the synchronous machine via a plurality of phase connections, and a voltage reduction module connects at least one of the phase connections with each other phase connection.

These and other features of the present invention can be best understood from the following specification and drawings, the following of which is a brief description.

DETAILED DESCRIPTION OF THE PREFERRED EMBODIMENT

Figure 1:
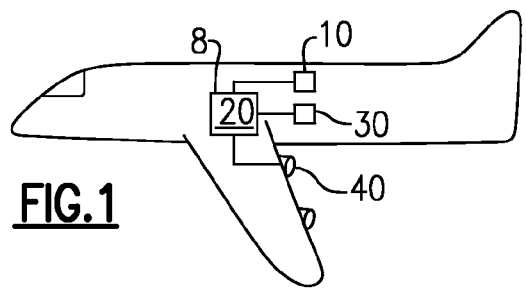
FIG. 1 illustrates an example aircraft having a synchronous machine connected to a turbine engine.

FIG. 1 illustrates an electrical generation system 8 for an aircraft that reduces weight and utilizes the same power phase connections for multiple purposes. The example system 8, includes a starter excitation source 10 and a generator excitation source 30 connected to a single synchronous machine 20 using partially overlapping connection lines. For example, the starter excitation source 10 can be connected to the synchronous machine 20 via phases A, B, and C, and the generator excitation source 30 can provide excitation currents over phases B and C, thereby reducing the number of physical phase connections to the synchronous machine. In this implementation, the starter excitation source 10 is used to provide excitation to the synchronous machine 20 to aid in turbine engine 40 startup. Once the turbine engine 40 has reached a state where it can operate without the aid of the synchronous machine 20, the synchronous machine 20 switches into generate mode. In the generate mode, the synchronous machine 20 uses the rotational power of the turbine engine 40 to rotate a rotor and generate three phase power. In order to properly function as a generator, an excitation current is provided to the synchronous machine 20 from the excitation source 30.

In a typical three phase system, the excitation current is provided by an exciter field driver 30 which is connected to the synchronous machine 20 over two of the three phase connections, while the third phase connection is disconnected. Methods for adapting this system to operate with a system having two phases, or more than three phases are known in the art.

Voltage spikes can occur between the phase connections used by the exciter field driver 30 and the disconnected phase connection which is only used by the starter excitation source 10. The voltage spikes can cause a phase imbalance in the synchronous machine 20, resulting in uneven power distribution between the phases of the generator, as well as causing a voltage buildup in a generator control unit. In order to compensate for the voltage spikes a voltage reduction module can be implemented according to the following examples.

Figure 2:
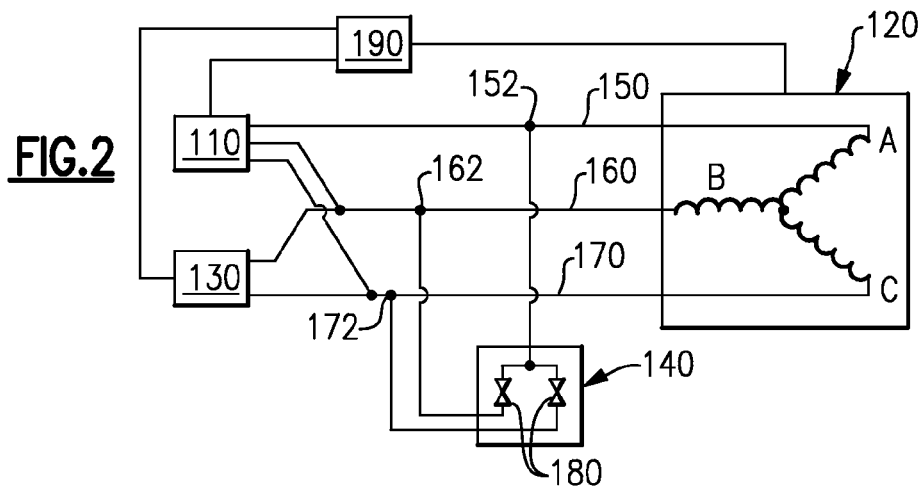
FIG. 2 is a schematic illustration of an electrical system having a starter generator, an excitation generator, and a synchronous machine connected through a voltage reduction module according to one example.

FIG. 2 is a schematic diagram of an electrical system, which could be used in the example of FIG. 1, having a starter excitation source 110, a synchronous machine 120, and an exciter field driver 130. The synchronous machine 120 is connected to the starter excitation source 110 through three phases A, B, and C. Phase A corresponds to phase connection 150, Phase B corresponds to phase connection 160, and Phase C corresponds to phase connection 170. Additionally connected to the synchronous machine 120 is an exciter field driver 130. The exciter field driver 130 is connected to the synchronous machine 120 through two phase connections 160, 170, and the third phase connection 150 is disconnected when the synchronous machine is operating in a generate mode. The circuit also includes a voltage reduction module 140 which is connected to each of the phase connections 150, 160, 170. The voltage reduction module 140 includes a transient voltage suppressor 180 connecting each of the connected phase lines 160, 170 to the disconnected phase line 150.

The synchronous machine 120 can operate in either a starter mode where a starter excitation source 110 provides three phase power to aid in the initial start of the turbine engine, or in a generator mode where the exciter field driver 130 provides the excitation power needed to generate electrical power to be output to electrical components on an aircraft or other system.

While the system is operating in a starter mode, the starter excitation source 110 is connected to all three phases A, B, C through the phase connections 150, 160, 170. Once the synchronous machine 120 has reached a stable operating point and no longer needs three phase power from the starter excitation source 110 to operate, the starter excitation source 110 disconnects from the synchronous machine using either switching connections internal to the starter excitation source 110, or external switching connections controlled by a generator control unit 190.

When the starter excitation source 110 ceases providing three phase electrical power to the synchronous machine 120, the excitation current source 130 begins providing an excitation current to the synchronous machine 120 over two phase connections 160, 170, and the synchronous machine 120 switches into a generate mode to generate electrical power. In order for the synchronous machine 120 to provide a stable power supply in generate mode, a DC current is transmitted from the excitation source 130 to phases B and C of the synchronous machine 120 as an excitation current. The DC current is provided by switching between a positive DC voltage and a negative DC voltage being provided across the phase connections 160 and 170. Methods for providing appropriate excitation currents for synchronous machine power generation are known in the art.

Each time the DC excitation voltage switches, a voltage spike occurs between the disconnected phase connection 150 and each of the connected phase connections 160, 170. When the voltage spike occurs, the voltage reduction module 140 allows the voltage spike to be at least partially dissipated in a transient voltage suppressor 180 connecting the disconnected phase connection 150 with the connected phase connections 160, 170. The voltage reduction module has at least one transient voltage suppressor 180 connected between the disconnected phase 150 and each other phase 160, 170. The dissipation of the voltage spike across the transient voltage suppressors 180 limits the voltage levels between all three phase connections 150, 160, and 170. Physical construction of transient voltage suppressors, and their properties are known in the art.

Figure 3:
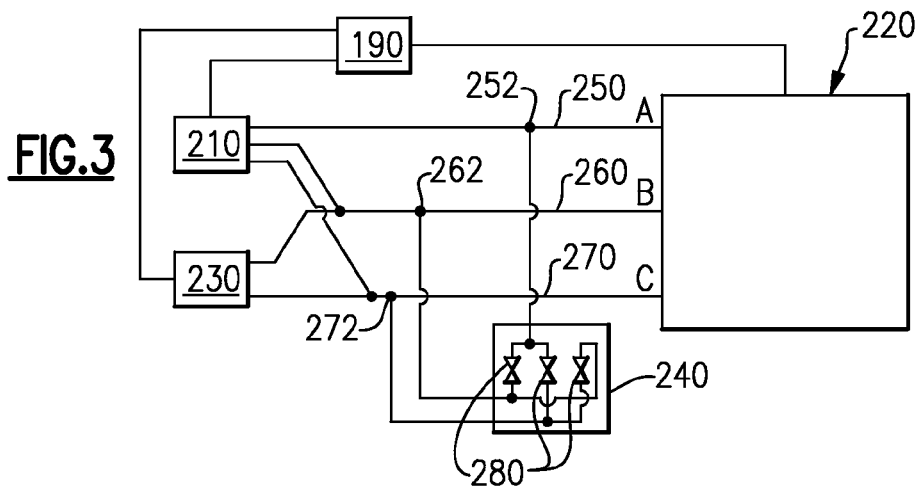
FIG. 3 is a schematic illustration of another electrical system having a starter generator, an excitation generator, and a synchronous machine connected through a voltage reduction module according to one example.
Figure 4:
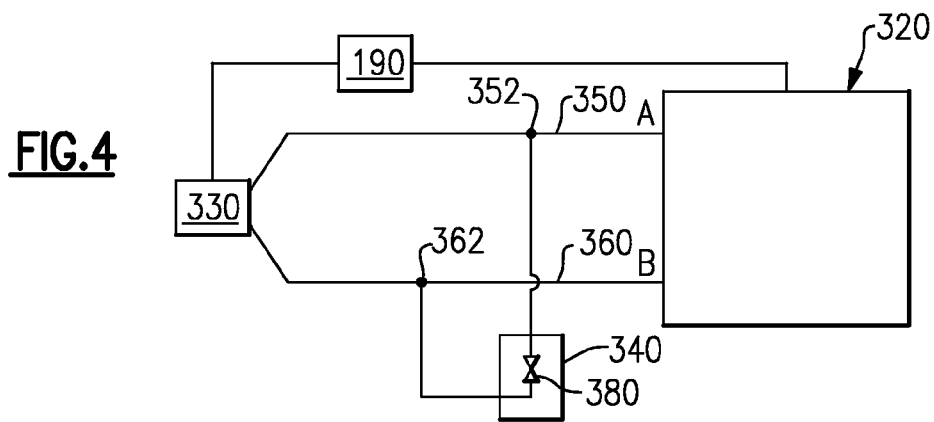
FIG. 4 is a schematic illustration of an electrical system having an excitation generator and a synchronous machine connected through a voltage reduction module.

While operating under normal conditions a transient voltage suppressor does not allow current to pass, and therefore does not dissipate any voltage. Transient voltage suppressors can be either unidirectional or bidirectional. A bi-directional transient voltage suppressor is illustrated in the examples of FIGS. 2, 3, and 4. Bi-directional transient voltage suppressors, such as the transient voltage suppressors 180, 280, 380 used in FIGS. 2, 3, and 4 have an avalanche breakdown potential, at which point the transient voltage suppressor allows current to pass through, and before which the transient voltage suppressor prevents all current from passing through. This effectively creates a voltage clamp which prevents the voltage of the system from exceeding the avalanche breakdown potential of the transient voltage suppressor. Since the transient voltage suppressor is connected across the disconnected phase connection 150 and a corresponding phase connection 160, 170, each of the above described voltage spikes is clamped at the voltage level of the avalanche breakdown potential of the transient voltage suppressor, thereby reducing the magnitude of the voltage spikes caused by switching.

When there is a shorted rotating diode condition in the synchronous machine, voltage builds up rapidly within the generator control unit 190. The rapid rate of voltage buildup shortens the amount of time available to respond to the shorted rotating diode condition. The inclusion of the transient voltage suppressors 180 in the voltage reduction module 140, decreases the rate of voltage buildup in the generator control unit 190. The decrease in the rate of voltage buildup in the generator control unit 190 allows the generator control unit 190 more time to respond to a shorted rotating diode condition, thereby allowing simpler and cheaper shorted rotating diode condition detection techniques, which have a longer response time, to be used.

The example of FIG. 3 illustrates a system similar to the example of FIG. 2, having a starter excitation source 210, an exciter field driver 230, and a synchronous machine 220. The example of FIG. 2 differs from the example of FIG. 1 in that a voltage reduction module 240 contains three sets of transient voltage suppressors 280, and the transient voltage suppressors 280 connect each phase connection 250, 260, 270 to each other phase connection 250, 260, 270. The presence of three transient voltage suppressors 280 within the voltage reduction module 240, as well as the connections between each phase connection 250, 260, 270 allows any phase connection 250, 260, 270 to be used as the disconnected phase while the system is operating in generate mode, whereas the example of FIG. 1 only allows Phase A to be the disconnected phase connection 150. This configuration provides added flexibility in design, while still allowing for identical functionality over the example of FIG. 2.

The example of FIG. 4, illustrates a two phase system having only an exciter field driver 330 and a synchronous machine 320. The example of FIG. 4 can be used in any system which does not operate as a starter, and does operates only as a generator. The exciter field driver 330 is connected to the synchronous machine 320 via two phase connections 350, 360. Additionally present in the example of FIG. 4 is a voltage reduction module 340 containing a transient voltage suppressor 380 which connects the two phase connections 350, 360.

The exciter field driver 330 in the example of FIG. 4 operates identically to the exciter field drivers 120, 220 described in the previous examples. The exciter field driver 330 of FIG.

4 does not share phase connections 350, 360 with a starter excitation source, and therefore the problem of phase imbalances resulting from voltage spikes is avoided. The voltage buildup in the generator control unit 190, described above, which results from the shorted rotating diode can still occur. Since the voltage buildup can still occur, implementing a voltage reduction module 340 and thereby decreasing the voltage buildup rate within a generator control unit 190, effectively increases the available response time and provides the benefits described above for the previous examples.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric power system comprising;
   a synchronous machine;
   a starter excitation source electrically connected to said synchronous machine via a plurality of phase connections;
   an exciter field driver, electrically connected to said synchronous machine via a portion of said plurality of phase connections; and
   at least one of said plurality of phase connections is connected to each other phase connection through a plurality of transient voltage suppressors.

2. The electric power system of claim 1, wherein each of said transient voltage suppressors comprises a bi-directional transient voltage suppressor.

3. The electric power system of claim 1, wherein each of said transient voltage suppressors is configured to dissipate voltage between said phases when said voltage exceeds an avalanche breakdown point.

4. The electric power system of claim 1, additionally comprising a generator control unit connected to said exciter field driver.

5. The electric power system of claim 4, wherein said transient voltage suppressors are additionally configured to reduce a voltage buildup rate within said generator control unit.

6. The electric power system of claim 1, wherein said plurality of phases comprises three phases.

7. The electric power system of claim 6, wherein a first, second, and third of said three phases connects said starter excitation source to said synchronous machine.

8. The electric power system of claim 7, wherein a second and third of said three phases connects said exciter field driver to said synchronous machine.

9. The electric power system of claim 8, wherein said second and said third of said three phases are each connected to said first of said three phases via a transient voltage suppressor.

10. An aircraft power generation system comprising;
    a synchronous machine mechanically connected to a turbine rotor;
    a starter excitation source electrically connected to said synchronous machine via a plurality of phase connections;
    an exciter field driver electrically connected to said synchronous machine via a plurality of phase connections; and
    a voltage reduction module connecting at least a first of said plurality of phase connections with each other of said plurality of phase connections.

11. The power generation system of claim 10, wherein said voltage reduction module comprises a plurality of bi-directional transient voltage suppressors.

12. The power generation system of claim 11, wherein each of said transient voltage suppressors is configured to dissipate voltage between said first of said plurality of phase connections and a corresponding phase connection.

13. The power generation system of claim 10, additionally comprising a generator control unit connected to said exciter field driver.

\* \* \* \* \*